(12) United States Patent
Adams et al.

(10) Patent No.: US 7,500,037 B2
(45) Date of Patent: Mar. 3, 2009

(54) SYSTEM, METHOD AND PROGRAM FOR MANAGING LOCKS

(75) Inventors: Kevin Scott Adams, Endicott, NY (US); Mark John Lorenc, Endwell, NY (US); Damian Leo Osisek, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 11/668,574

(22) Filed: Jan. 30, 2007

(65) Prior Publication Data

US 2008/0184249 A1 Jul. 31, 2008

(51) Int. Cl.
*G06F 9/52* (2006.01)

(52) U.S. Cl. .................. 710/200; 718/100; 718/102; 707/8

(58) Field of Classification Search .............. 710/200; 718/100, 102; 707/8
See application file for complete search history.

(56) References Cited

U.S. PATENT DOCUMENTS

| | | | | |
|---|---|---|---|---|
| 5,940,828 A | * | 8/1999 | Anaya et al. ............... 707/8 |
| 6,330,612 B1 | * | 12/2001 | Boonie et al. ............ 709/229 |
| 6,539,446 B1 | * | 3/2003 | Chan ......................... 710/200 |
| 6,965,893 B1 | * | 11/2005 | Chan et al. ..................... 707/8 |
| 7,346,720 B2 | * | 3/2008 | Fachan ....................... 710/200 |
| 2004/0199734 A1 | * | 10/2004 | Rajamani et al. ........... 711/163 |
| 2006/0224805 A1 | * | 10/2006 | Pruscino et al. ............ 710/200 |
| 2007/0150630 A1 | * | 6/2007 | Armstrong et al. ......... 710/200 |
| 2008/0071997 A1 | * | 3/2008 | Loaiza et al. ............... 711/154 |

* cited by examiner

*Primary Examiner*—Glenn A Auve
(74) *Attorney, Agent, or Firm*—Arthur J. Samodovitz

(57) ABSTRACT

Managing locks under conditions wherein there is a first shared hold on a lock. There is a first pending request for a first exclusive hold on the lock; the first pending request for said first exclusive hold is made after the first shared hold was granted. There is a second pending request for a second exclusive hold on the lock; the second pending request for the second exclusive hold is made after the first pending request for the first exclusive hold. There is a third pending request for a second shared hold; the third pending request for the second shared hold is made after the second pending request for the second exclusive hold. First program instructions grant one of the pending requests for an exclusive hold in response to the first shared hold being released. Second program instructions grant the third pending request for the second shared hold in response to release of the exclusive hold previously granted in response to the one request for an exclusive hold. Third program instructions grant another of the requests for an exclusive hold in response to the second shared hold being released.

9 Claims, 7 Drawing Sheets

SYSTEM, METHOD AND PROGRAM FOR MANAGING LOCKS

FIELD OF THE INVENTION

The present invention relates generally to computer systems, and more specifically to management of locks available for both shared and exclusive ownership in a computer system.

BACKGROUND OF THE INVENTION

It is known to provide locks permitting both exclusive and shared holds for computer resources such as data structures, work queues, devices, adapters, files, databases, and directories to enable a computer program or program function to access each resource. For example, a computer program (executing in either a single processor or multiprocessor environment) can obtain an exclusive hold of a lock on a file to update the file. The exclusive hold prevents any other program from accessing the file while it is being updated, even to read the file. This prevents the other programs from accessing stale or inconsistent data in the file. However, if one or more programs only want to read a file (which is not currently locked exclusively), they can all concurrently obtain a shared hold of the lock, and concurrently read (but not update) the file because none of these programs will change the data. Some lock management operations can be performed by a macro which expands inline to generate code. Such a macro can handle most common cases. Other lock management operations can be performed by a program subroutine to which the macro delegates processing in the remaining cases. The overhead of the subroutine linkage is thereby avoided in the common cases.

In some cases, a thread of execution within a program or program function waits, by looping or "spinning", until a lock it requests becomes available and is granted. In such a case, the lock is considered to be a "spin lock." In other cases, a thread requests a lock and is deferred until it is granted. In the interim other threads of the same or other programs or program functions can execute on the processor. Typically, a spin lock is used when there are multiple processors in a single computer executing different threads, and the resource is accessed in non pre-emptable portions of the threads while protected by the lock.

For example, there can be multiple applications, a single operating system and multiple processors in a computer. Each processor has its own dispatcher function and scheduler function, and there is a common work queue in shared memory. The dispatcher or scheduler program function executing on each processor may need a lock to access the common work queue. Typically, such a lock would be a spin lock, and the dispatcher or scheduler program function would spin, waiting for the lock. In the simplest implementation, spin locks are not necessarily granted in the order that they are requested. Instead, they are obtained by whichever processor first happens to find the lock in an available state. However, when there are multiple different programs executing on the same processor (in a time shared manner), each program typically requests a deferring type of lock. Typically, requests for deferring types of locks are queued and granted in the order requested, when the lock becomes available. A lock manager release function known in the prior art typically removes from the front of the queue either a single exclusive request or a chain of consecutive shared requests, and grants the lock to those requestors upon release by its current holder.

One problem with known types of lock managers occurs when there are multiple sequential/staggered requests for shared holds on a lock, and requests for shared holds continue to be granted whenever the lock state permits it. In this case, requests for a shared lock will continue to be granted as long as there is at least one outstanding shared hold that has not yet been released. Requests for exclusive holds will be delayed during this period. For example, a first request for a shared hold occurs at time "0" and the requestor holds the lock for 1 second. A second request for a shared hold on the same lock occurs at time "0.9" seconds, and is granted and the requestor holds the lock for 1 second, i.e. until time "1.9" seconds. A third request for a shared hold on the same lock occurs at time "1.7" seconds, and is granted and the requestor holds the lock for 1.5 seconds, i.e. until time "3.2" seconds. A fourth request for a shared hold on the same lock occurs at time "3.0" seconds, and is granted and the requestor holds the lock for 1 second i.e. until time "4.0" seconds. In such a case, a request for an exclusive hold on the same lock made at time "0.5" seconds will not be granted until the string of overlapping shared holds are all released and there is no other request for a shared hold during this period. This prolongs the time that the lock is unavailable for an exclusive hold. This problem is called "livelock" and can "starve" a request for an exclusive hold, even when the request for the exclusive hold is received before other requests for a shared hold on the same lock are received (and granted). In the foregoing example, the request for the exclusive hold made at time "0.5" seconds will not be granted until at least time "4.0" seconds.

In the past, the livelock problem has been addressed by strictly ordering the lock requests by arrival time, and granting them first in, first out. However, in a virtualized environment this can lead to inefficiencies because the processor which is next entitled to the lock may not be dispatched by the underlying hypervisor when the lock becomes available, whereas other processors may be. This will cause such dispatched requestors to continue to spin when they could make immediate use of the lock if it were granted.

A second problem with strictly ordering lock requests by arrival time is that it is inefficient in batching together requests for shared holds of a lock, if exclusive and shared requests are interleaved. As an example, suppose that a lock is not held, and a request is made and granted for an exclusive hold of the lock at time "0" seconds. Also assume that all lock holders will hold the lock for 1 second. Now assume that before time "1.0", there is a shared request, followed by an exclusive request, followed by a shared request, followed by an exclusive request. In this example, a strictly ordered lock manager at time "1.0" would handle the release of the initial exclusive hold, and grant a shared hold that would last for 1 second. At time "2.0" the shared hold would be released and an exclusive hold would be granted. At time "3.0" the exclusive hold would be released and another shared request would be granted. At time "4.0" the shared hold would be released an exclusive request would be granted. And finally, at time "5.0" the exclusive hold would be released. However, if at time "1.0" the two pending shared requests were batched and granted together, the next exclusive request would still be granted at time "2.0", but the third exclusive request would be granted earlier, i.e. at time "3.0" and at time "4.0" would release the exclusive hold, finishing one second earlier. Thus, a strictly ordered lock manager can benefit from batching shared requests only when the shared requests arrive one after the other with no exclusive requests in between.

Another problem with known types of lock managers occurs when there are multiple sequential requests for exclusive holds of a lock, followed by multiple overlapping requests for shared holds of the lock. In this case, the multiple requestors for the shared holds all have to wait for each of the prior requests for exclusive holds to be satisfied. In other words, many requestors of shared holds that can be satisfied at least partially in an overlapped manner have to wait for each request for an exclusive hold that each satisfies only a single requestor.

The following lock-granting algorithm was also known. According to this algorithm, a pending request for an exclusive hold on a lock takes precedence over any pending requests for a shared hold on the same lock. This algorithm is optimum when exclusive requests are rare, but can cause lengthy waits for shared requests when exclusive requests are more common.

Accordingly, an object of the present invention is to reduce average wait time for requestors, particularly when there is a mix of shared requests and exclusive requests.

SUMMARY OF THE INVENTION

The present invention resides in a computer system, method and program for managing locks under conditions wherein there is a first shared hold on a lock. There is a first pending request for a first exclusive hold on the lock; the first pending request for said first exclusive hold is made after the first shared hold was granted. There is a second pending request for a second exclusive hold on the lock; the second pending request for the second exclusive hold is made after the first pending request for the first exclusive hold. There is a third pending request for a second shared hold; the third pending request for the second shared hold is made after the second pending request for the second exclusive hold. First program instructions grant one of the pending requests for an exclusive hold in response to the first shared hold being released. Second program instructions grant the third pending request for the second shared hold in response to release of the exclusive hold previously granted in response to the one request for an exclusive hold. Third program instructions grant another of the requests for an exclusive hold in response to the second shared hold being released.

In accordance with a feature of the present invention, there is a fourth request for a third shared hold on the lock; the fourth request for the third shared hold is made after the third request for the second shared hold and before release of the exclusive hold previously granted in response to the one request for an exclusive hold. The second program instructions grant the fourth request for the third shared hold for substantially concurrent holding with the second shared hold.

In accordance with another feature of the present invention, there is a fourth request for a third shared hold on the lock. The fourth request for the third shared hold is made after the third request for the second shared hold and after release of the exclusive hold previously granted in response to the one request for an exclusive hold. Fourth program instructions grant the fourth request for the third shared hold after release of the second exclusive hold.

DETAILED DESCRIPTION OF THE PREFERRED EMBODIMENTS

Figure 1:
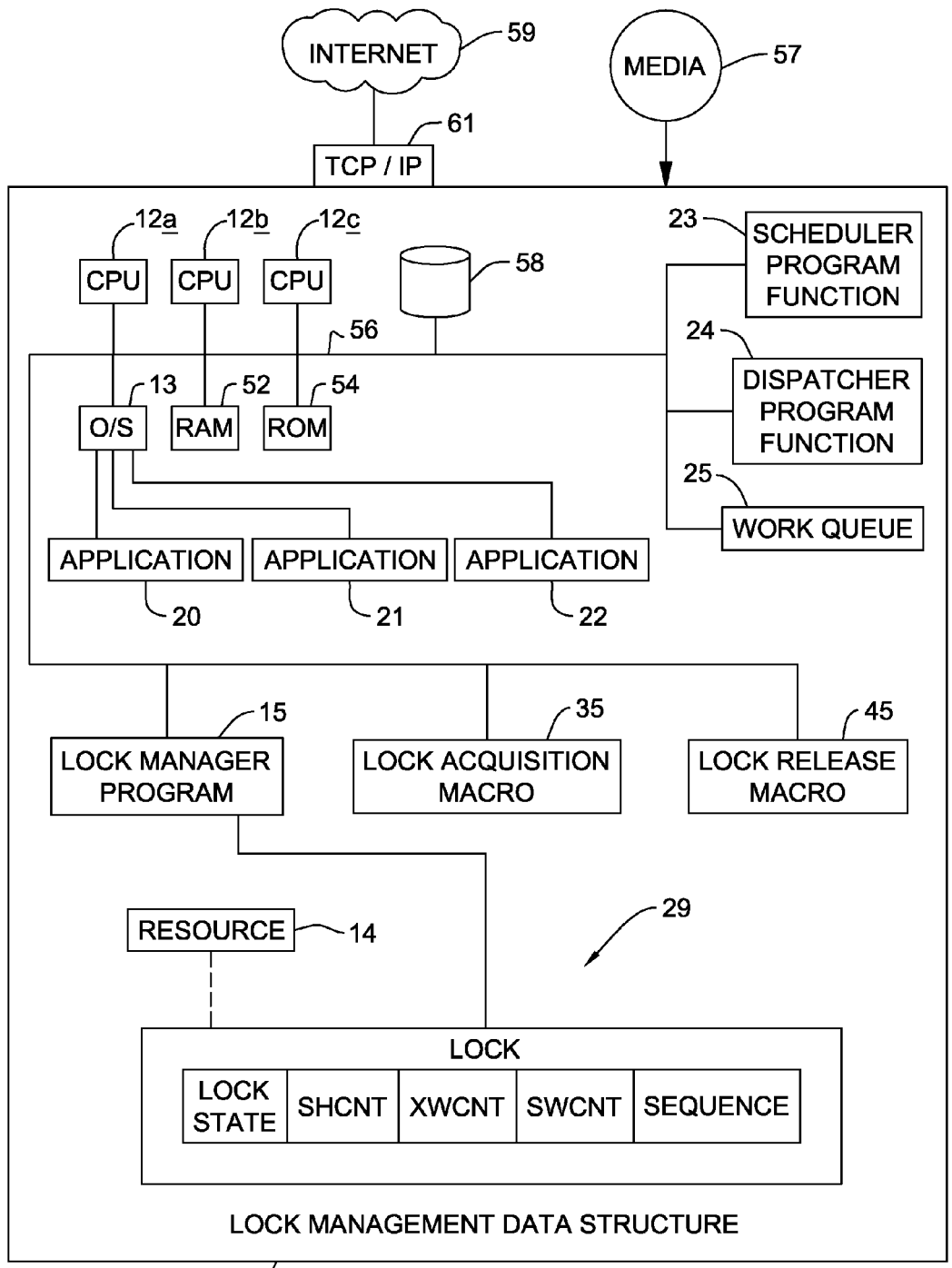
FIG. 1 is a block diagram of a computer system including a lock manager program, lock acquisition program macro and a lock release program macro according to the present invention.

The present invention will now be described in detail with reference to the figures. FIG. 1 illustrates a computer system 10 including multiple processors (or CPUs) 12$a$,$b$,$c$, each executing one or more programs. In the illustrated example, there is a single operating system 13 and multiple applications 20, 21 and 22, all executed by processors 12$a$,$b$,$c$ under control of a known scheduler program function 23 and a known dispatcher program function 24 within the operating system. The operating system can be IBM z/OS operating system, a UNIX operating system, or Microsoft Windows operating system, for example, for a nonvirtual machine environment, or a virtual machine hypervisor such as IBM z/VM hypervisor, Xen hypervisor, or EMC VMWare hypervisor. Scheduler program function 23 schedules work items on a common work queue 25 for execution, and dispatcher program function 24 dispatches the scheduled work items to an available processor. System 10 also includes a known type of resource 14, such as a data structure, a work queue, a device, an adapter, a file, a database, or a directory, accessible in either an exclusive manner or shared manner with a corresponding type of hold of the associated lock. System 10 also includes a known RAM 52 and ROM 54 on a common bus 56, and storage 58.

System 10 also includes a lock manager program 15, lock acquisition program macro 35 and lock release program macro 45, according to the present invention. The lock manager 15 can support one of more locks 29 for resources 14 by allowing either an exclusive hold of a lock 29 or one or more concurrent, shared holds of that same lock. In the illustrated embodiment, the requestors loop or spin while waiting for the lock they request. (However, the present invention is also applicable when the requestors do not wait for the lock (i.e. the lock is a deferring type) or wait by a technique other than spinning.) The hold of the lock is granted to a processor (in a multiprocessor system) on behalf of the thread that is currently executing on that processor.

Lock manager program 15, lock acquisition macro 35 and lock release macro 45 prevent starvation of exclusive lock request waiters, and reduce average wait time of the requesting processors and threads as follows. Requests for exclusive holds of a lock and requests for shared holds of the same lock arrive in some sequence, as the case may be. When the first request arrives for a lock (which is available for either type of lock request), the request is granted. For purposes of explanation, assume that the first request is for an exclusive hold. When the holder releases the exclusive hold, if there are any pending requests for a shared hold of the lock, the pending requests for the shared holds are all permitted to be granted simultaneously (when the exclusive hold is released) even if there are prior waiting requests for an exclusive hold of the same lock. Thus, multiple shared requestors are not kept waiting while single exclusive requestors sequentially receive and utilize an exclusive hold of the lock. Moreover, during the wait for the exclusive hold to be relinquished, multiple requests for shared holds may arrive and all be processed concurrently in a highly overlapped manner when the exclusive hold is released. The high degree of overlapped processing minimizes the wait time for a next exclusive request. After the shared holds are released, then another exclusive hold is granted (assuming there is a waiting request for another exclusive hold) even if additional requests for shared holds have arrived while the current shares were held. This prevents a series of sequential requests for shared holds to starve one or more requests for exclusive holds. Thus, the granting of locks alternates between exclusive and shared holds when such an alternate request exists at the time the other type of hold is relinquished. This minimizes overall, average wait time and avoids starvation of requests for exclusive holds. The implementation of the foregoing lock manager program 15, lock acquisition macro 35 and lock release macro 45 is described in more detail as follows.

During the processing described below with reference to FIGS. 2-5, the lock manager program 15 updates a lock management data structure or lock 29 comprising the following fields:

"State"—current state of the lock, i.e. "Av" meaning that the lock is currently available for either shared or exclusive ownership, "AvX" meaning that the lock is currently available for only exclusive ownership, "AvS" meaning that the lock is currently available for only shared ownership, "X" meaning that the lock is currently held by an exclusive owner, or "S" meaning that the lock is currently held by one or more shared owner(s).

"Shcnt"—the count or number of shared holders of the lock (valid only when "state"=S, zero otherwise).

"Xwcnt"—the count or number of requestors (processors) waiting for an exclusive hold of the lock.

"Swcnt"—the count or number of requestors (processors) waiting for a shared hold of the lock.

"Seq" or "Sequence"—a number which is incremented each time an exclusive hold is released. Such incrementing indicates that the lock will next be available for a shared hold, assuming there is a shared requestor. In certain circumstances described below, requestors of a shared hold spin on the sequence number until it is incremented; then they are eligible to receive a shared hold of the lock.

Lock manager program 15 uses the available-for-exclusive state and available-for-shared state to grant individual exclusive requests and batch and grant shared requests in an alternating manner. This is done so that large numbers of sequential/staggered shared requests cannot keep the lock held shared continuously and therefore, cannot starve or block a request for an exclusive hold of the lock indefinitely ("livelock"). This also prevents a large number of shared requests from waiting excessively for sequential grant and release of multiple, prior sequential exclusive holds that each satisfy only one requestor.

Subject to these restrictions, lock requests may be granted out of order, thus allowing more efficient use of the lock in a virtualized environment.

FIGS. 2-7, explained below, depict macros and program subroutines for managing a lock according to the present invention. Some lock management operations are performed by the macros, which expands inline to generate code. Other lock management operations are performed by program subroutines. The overhead of linking the program subroutines is avoided in those cases where the macros perform the lock management operations. In FIGS. 2-7, the steps performed by the program subroutines are enclosed in broken lines.

Figure 2:
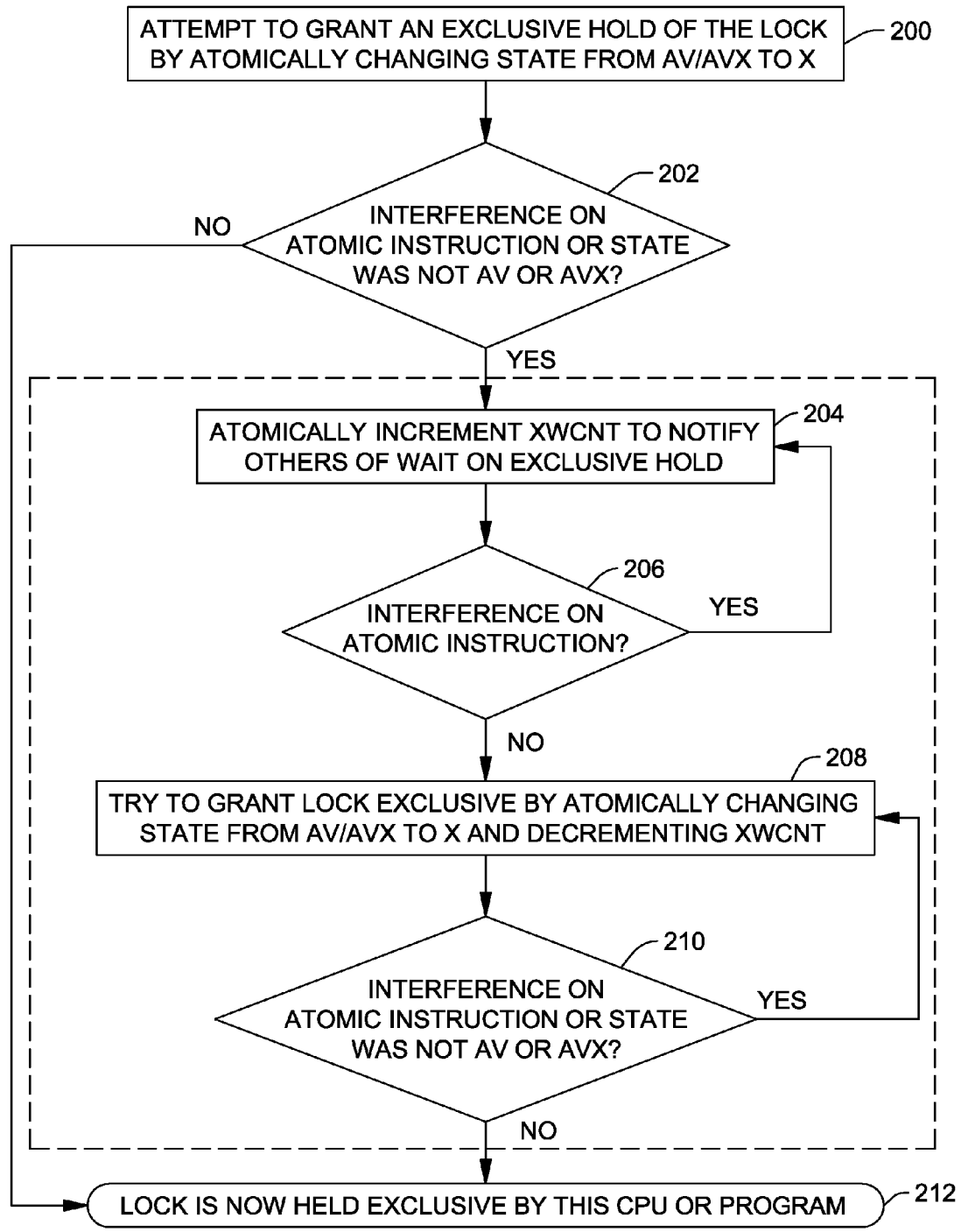
FIG. 2 is a flow chart of the lock acquisition program macro and lock manager program of FIG. 1 in the process of granting an exclusive hold of a lock.

FIG. 2 illustrates processing by the lock acquisition macro 35 and lock manager program 15 in more detail. A program or program function (such as application 20, 21 or 22, scheduler 23 or dispatcher 24 of operating system 13 executing on one of the processors 12a,b or c) invokes the processing of FIG. 2 when the program or program function needs an exclusive hold on a resource and calls the lock acquisition macro 35 beginning at step 200. In response, the lock acquisition macro 35 assumes that the lock is available in state Av or AvX and atomically attempts to change a lock state of Av or AvX to X (step 200). If the lock state was Av or AvX, i.e. the lock was available for all types of hold or for an exclusive hold, and there was no "interference" while the lock state was changed in step 200 (decision 202, no branch), then the lock acquisition macro 35 successfully granted the exclusive hold to the requestor in step 200, and the lock will be held by the exclusive hold requestor (step 212). "Interference" occurs when another function executing on another processor changed the state of any of the fields of the lock 29 while the lock acquisition macro 35 executed step 200 and decision 202. In step 202, the lock acquisition macro determined if there was interference in step 200, for example, by checking the condition code resulting from a Compare-and-Swap instruction which attempted the atomic operation. However, the lock acquisition macro cannot grant the exclusive hold in step 200 if the state of the lock was not Av or AvX at the time step 200 was executed, i.e. the lock was not currently available for all types of hold or an exclusive hold, or there was interference during step 200 (decision 202, yes branch). In such a case, the lock acquisition macro 35 calls the lock manager program 15 which atomically increments the count (xwcnt) of the number of requestors waiting for an exclusive hold of the lock (step 204). Next, the lock manager program 15 determines if there was interference during step 204 that prevented successful incrementing of the count xwcnt (decision 206). If so (decision 206, yes branch), then lock manager program 15 loops back to step 204 to try again to increment the count of requestors waiting for an exclusive hold of the lock. If not (decision 206, no branch), then lock manager program 15 tries to grant the exclusive hold of the lock by trying to atomically change a lock state of Av or AvX to X and decrementing the count of requestors waiting for an exclusive hold of the lock (step 208). If the lock state was Av or AvX when step 208 was performed, i.e. the lock was available for all types of holds or only for an exclusive hold of the lock, and there was no "interference" while the lock state was changed and the count of requestors waiting for an exclusive hold of the lock was decremented in step 208 (decision 210, no branch), then the lock manager function grants the exclusive hold of the lock to the requestor in step 208, and the lock will be held by the exclusive requestor (step 212). The lock manager function cannot grant the exclusive hold of the lock in step 208 if the state of the lock is not Av or AvX, i.e. the lock was not available for all types of holds or for only an exclusive hold, or there was interference during step 208 (decision 210, yes branch). In such a case, the lock manager function 15 loops back to step 208 to try again. The lock manager program 15 will loop or spin on step 208 and decision 210 until an exclusive hold becomes available and is granted.

Figure 3:
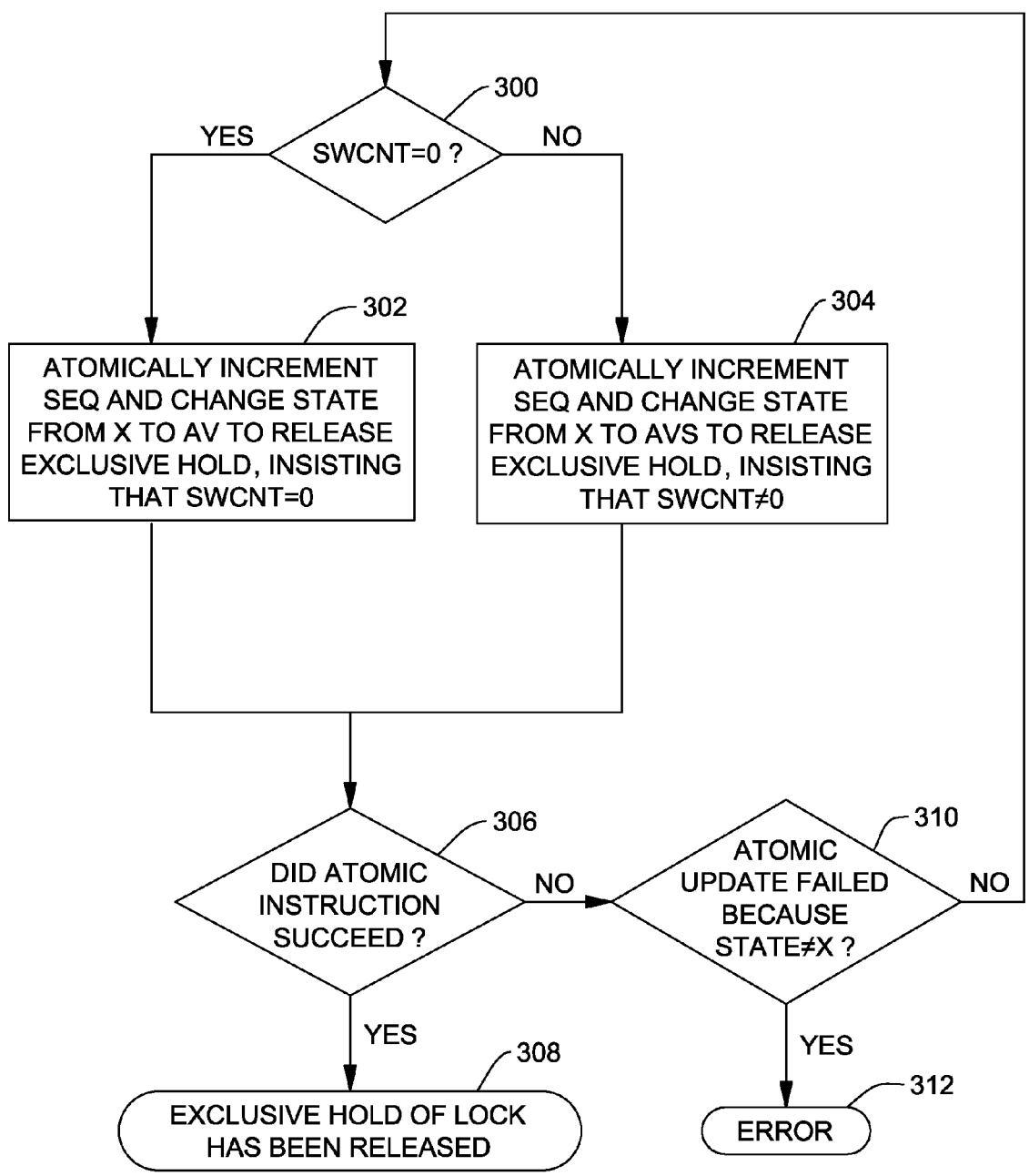
FIG. 3 is a flow chart of the lock release program macro of FIG. 1 in the process of releasing an exclusive hold of a lock.

FIG. 3 illustrates processing by lock release macro 45 to release an exclusive hold of the lock which was granted pursuant to processing of FIG. 2. When the program function that previously requested and received the exclusive hold of the lock concludes its access to the resource, the program function will call the lock release macro 45 beginning at decision 300 to release the exclusive hold. In response, the lock release macro 45 releases the exclusive hold, updates the lock management data structure 29 accordingly and determines who should get the lock next, as follows. The lock release macro determines if the number of shared hold requestors equals zero (decision 300). If so (decision 300, yes branch), there are no waiting shared hold requestors, and therefore no requirement to grant the next hold in a shared state. Next, lock release macro 45 atomically increments the sequence number (to indicate that an exclusive hold has been released) and attempts to change the state of the lock from X (held exclusively) to Av (available for all types of hold) to release the exclusive hold (step 302). This atomic update also confirms that the number of shared waiters is still zero. Refer again to decision 300, no branch where there is at least one shared hold requestor waiting at the time the program function (that wants to release the exclusive hold) invokes the lock release macro 45. In such a case, the next hold that should be granted is a request for a shared hold. Next, the lock release macro atomically increments the sequence number (to indicate that an exclusive hold has been released), and changes the state of the lock from X to AvS (step 304). This atomic update also confirms that the number of shared waiters is still nonzero. Because of the AvS state, lock acquisition macro 35 or lock manager program 15 on this or another processor will next grant a shared hold to a shared hold requestor regardless of whether there are any earlier waiting requests for an exclusive hold. Thus, invocations of lock acquisition macro 35 alternate grants of shared and exclusive holds, assuming both types of request are waiting at the time the lock is released.

After step 302 or 304 (as the case may be), the lock release macro determines whether the atomic update of step 302 or 304 succeeded (decision 306). If the update succeeded (decision 306, yes branch), then the exclusive hold has been successfully released and the lock management data structure has been properly updated (condition 308). If not (decision 306, no branch), then the lock release macro determines if the failure of the update was due to the lock not being in the held exclusive state (decision 310). If so (decision 310, yes branch), the program function that called the lock release macro to release an exclusive hold did not possess the exclusive hold. This is an error (condition 312), and that concludes processing. Refer again to decision 310 no branch, where the processing of the update failed due to a reason other than an erroneous lock state. In this case the failure must be due to interference from another processor. Therefore, the lock release macro loops back to decision 300 to repeat the foregoing processing.

Figure 4:
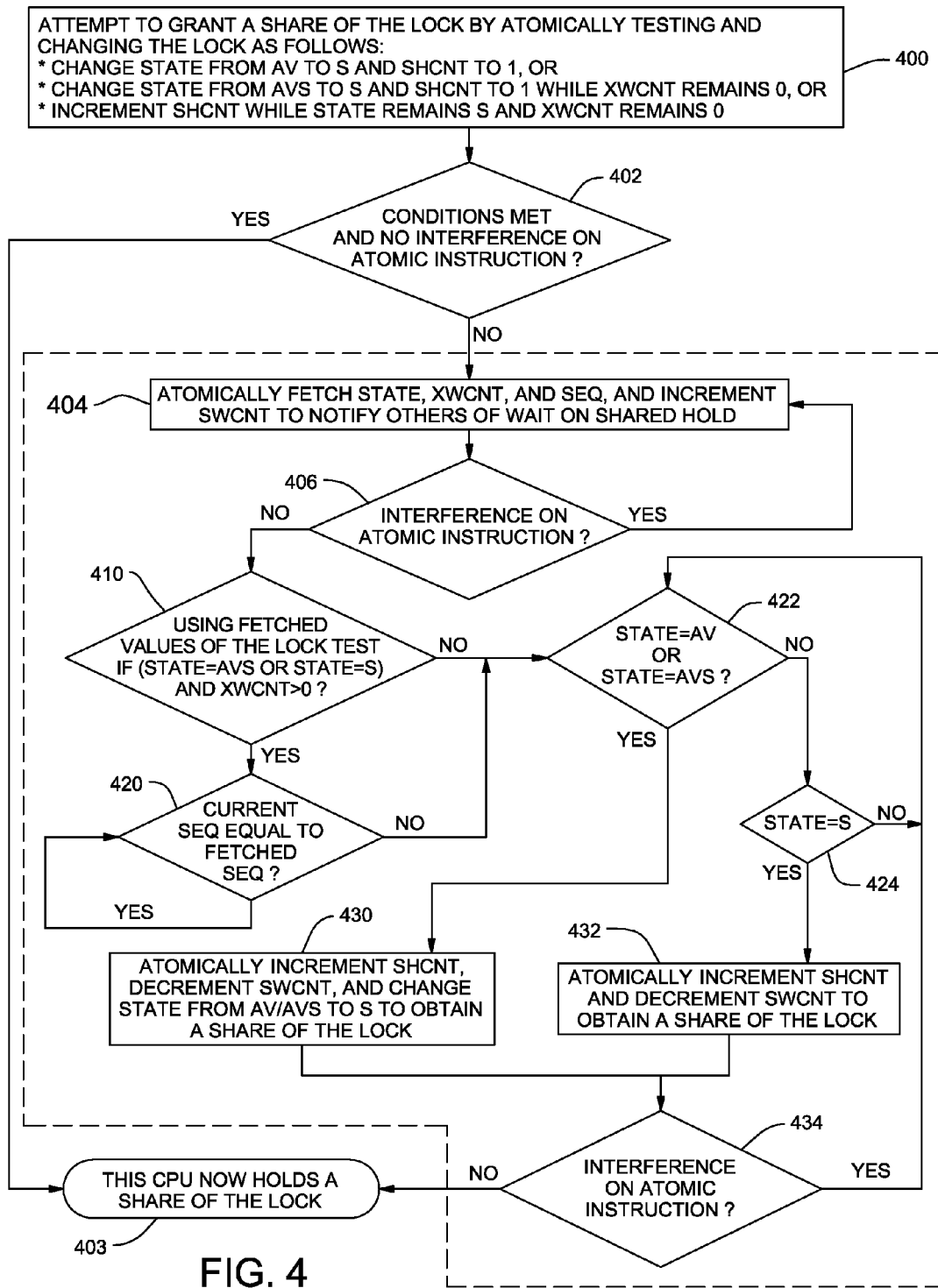
FIG. 4 is a flow chart of the lock acquisition program macro and lock manager program of FIG. 1 in the process of granting a shared hold of a lock.

FIG. 4 illustrates processing by the lock acquisition macro 35 and lock manager program 15 to obtain a shared hold of a lock for a shared hold requestor. When a program function executing on one of the processors 12a,b,c needs a shared hold, it calls the lock acquisition macro 35 beginning at step 400. In response, the lock acquisition macro will immediately grant the shared hold in step 400 if one of the following three conditions is met (and there is no interference in the process):

(i) the current state of the lock is available for any lock hold request, i.e. Av (in which case the lock acquisition macro increments the count of shared holders from zero to one), or (ii) the current state of the lock is available for shared holds, i.e. AvS, and there are no exclusive hold waiters (in which case the lock acquisition macro increments the count of shared lock holders from zero to one). (Thus, the lock acquisition macro will not grant this shared hold request, if the current lock is available for shared because of a prior batch of shared waiters, and there is a prior exclusive hold requestor which is waiting. In this case, only those prior shared hold requestors that have incremented swcnt are entitled to receive a shared hold of the lock at this time. This prevents starving of a waiting exclusive hold requestor.), or (iii) the current state of the lock is S and there are no exclusive hold waiters (in which case the lock acquisition macro increments the count of shared lock holders). (Thus, the lock acquisition macro will not grant another shared hold, if the current lock state is shared, and there is a prior exclusive hold requestor which is waiting. This prevents starving of a waiting exclusive hold requestor.)

If one of the foregoing three conditions was met in step 400 to grant the shared hold, and there was no interference to the atomic update during the processing of step 400, then the lock acquisition macro grants the shared hold in step 400 to the current requestor (condition 403). However, if none of the three conditions was met in step 400 to grant the shared hold or there was interference (decision 402, yes branch) during the processing of step 400 (decision 402, no branch), then the lock acquisition macro calls the lock manager program, which atomically both fetches the current state of the lock, the count of exclusive hold waiters and sequence number and increments the count of shared hold waiters (step 404). Next, the lock manager program determines if there was interference during the processing of step 404 (decision 406). If so (decision 406, yes branch), then the lock manager program loops back to step 404 to try again. If not (decision 406, no branch), then the lock manager program determines if the state of the lock fetched in step 404 is AvS or S and there are any exclusive hold waiters (decision 410). If so (decision 410, yes branch), then there is an exclusive hold waiter who is entitled to the lock next, i.e. after all of the current holders release their shared holds. In such a case, the lock manager program checks if the current sequence number equals the sequence number that was fetched in step 404. If the current sequence number equals the sequence number fetched in step 404 (decision 420, yes branch), then lock manager program spins, i.e. loops back to decision 420 to wait for the current sequence number to change. This ensures that this shared request will not be granted until the current or next exclusive hold has been released. If the current sequence number does not equal the sequence number fetched in step 404 (decision 420, no branch), this means that an exclusive hold has just been released. In such a case, the lock manager program checks if the lock is currently available for any type of hold or for a shared hold (decision 422). (Decision 410, no branch where the current state of the lock is not AvS or S or there are no exclusive hold waiters, also leads to decision 422.) If the lock is not currently available for any type of hold or for a shared hold (decision 422, no branch), then the lock manager program determines if the state of the lock is "S", i.e. that the lock is currently held in the shared state (decision 424). If not (decision 424, no branch), then the lock manager program spins, i.e. loops from decision 422, no branch to decision 424, no branch and back to decision 422 until any of the three states permitting a new shared hold occurs, i.e. Av, AvS or S. If the lock is found to be in state Av or AvS (decision 422, yes branch) before it is found in state S, then the lock manager program atomically increments the count (shcnt) of shared lock holders, decrements the count of waiters (swcnt) waiting to get a shared hold and changes the state of the lock from its current state of Av or AvS to S (step 430). However, if the lock is found in state S (decision 424, yes branch), before it is found in state Av or AvS, then the lock manager program atomically increments the count (shcnt) of shared lock holders and decrements the count of processors (swcnt) waiting to get a shared hold (step 432). (There is no need under these conditions to change the state to S; the state is already "S".) After step 430 or 432, as the case may be, the lock manager program determines if the interlocked update failed due to a change to any of the fields in lock management data structure 29 during the processing of step 430 or 432 (decision 434). If so (decision 434, yes branch), then the lock manager program loops back to decision 422 to repeat the foregoing processing. However, if the interlocked update succeeded as determined in decision 434, no branch, then the requesting program or processor now holds a share of the lock (condition 403).

Figure 5:
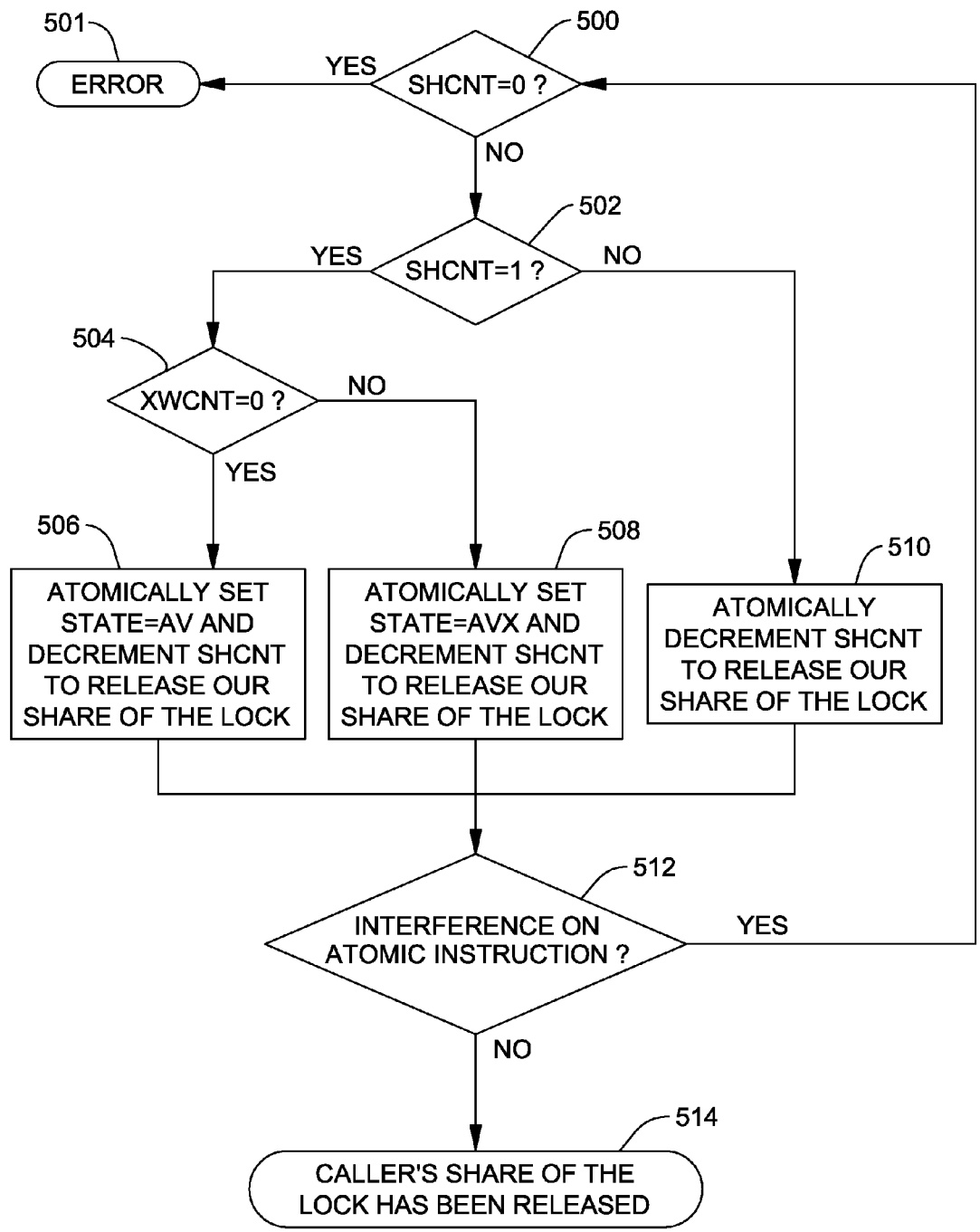
FIG. 5 is a flow chart of the lock release program macro of FIG. 1 in the process of releasing a shared hold of a lock.

FIG. 5 illustrates processing by the lock release macro 45 to release a shared hold of a lock. A program function which holds a share of a lock and wants to release it calls the lock release macro beginning at decision 500. In decision 500, the lock release macro 45 determines if the current count of shared lock holders "shcnt" equals zero. If so (decision 500, yes branch), then the caller is trying to release a share of a lock that the caller does not currently own, and this is an error condition (step 501). However, if the current count of shared lock holders equals one (decision 500, no branch and decision 502, yes branch), that is, the request is to release the only shared hold, then the lock release macro 45 determines if there are currently any waiters for an exclusive hold (decision 504). If not (decision 504, yes branch), then the lock release macro atomically sets the state of the lock to Av, i.e. available for any requestor, and decrements the count of shared lock holders to zero to release the shared hold (step 506). Refer again to decision 504 no branch, where there is at least one waiter for an exclusive hold. In such a case, the waiter for an exclusive hold is entitled to the lock, and the lock release macro atomically sets the lock state to AvX to indicate that the lock is available for an exclusive holder and decrements the count of shared holders to zero to release the shared hold of the lock (step 508). Refer again to decision 502, no branch, where there are other shared holders of the lock in addition to the caller. In such a case, the lock release macro 45 decrements by one the count of shared holders to release the share of the lock held by the caller, but not the shares held by the other holders (step 510). After step 506, 508 or 510 (as the case may be), the lock release macro determines if there was interference during execution of step 506, 508 or 510 (decision 512). If so (decision 512, yes branch), then the lock release macro loops back to decision 500 to repeat the foregoing steps. If not (decision 512, no branch), then the caller's shared hold of the lock has been successfully released (condition 514).

Figure 6:
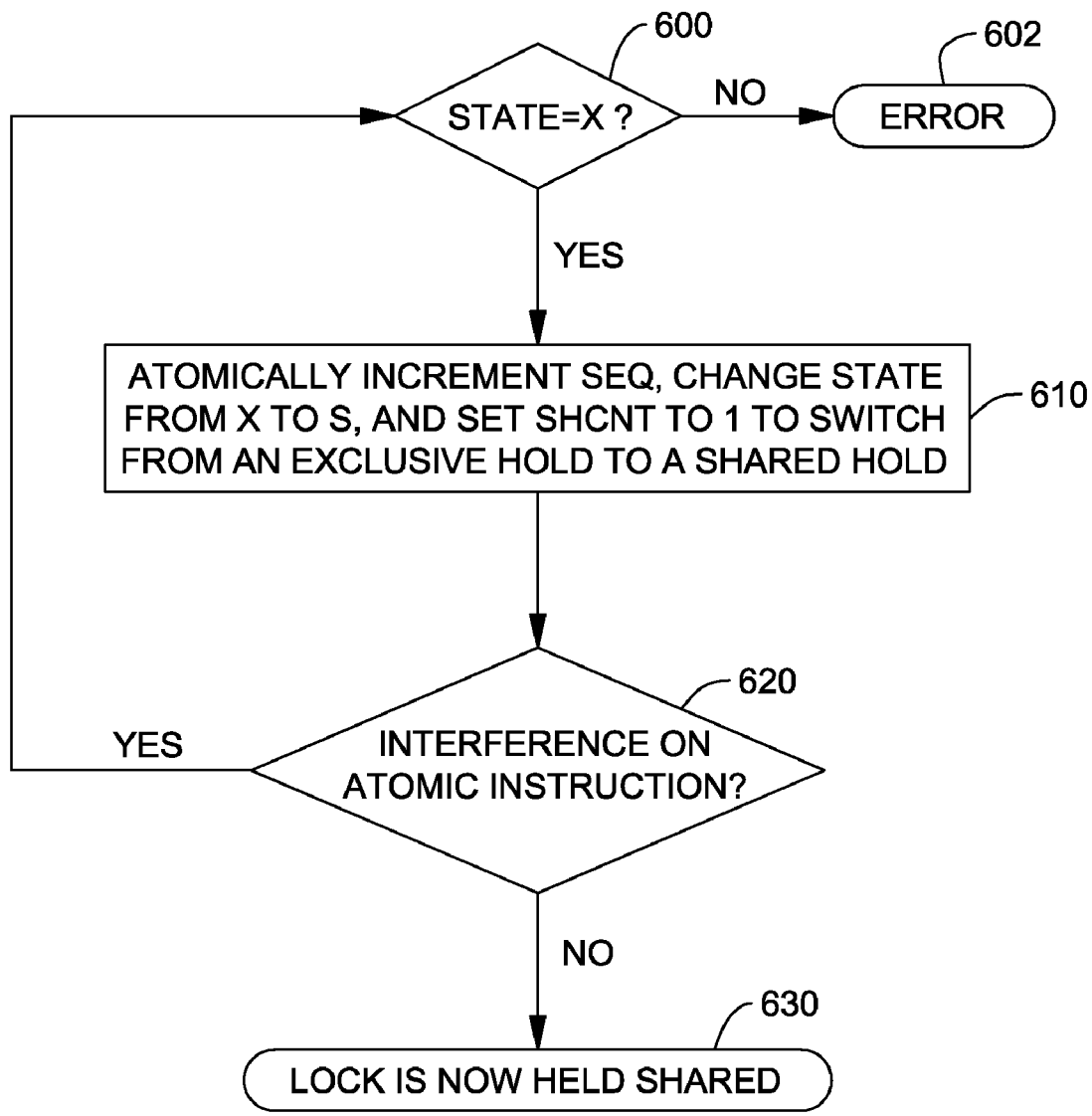
FIG. 6 is a flow chart of the lock acquisition macro of FIG. 1 in a process of changing an exclusive hold of a lock into a shared hold.

FIG. 6 illustrates processing by the lock acquisition macro 35 to switch an exclusive hold of a lock to a shared hold without releasing the lock in between. A program function which has an exclusive hold of a spin lock and wants to switch to a shared hold invokes the lock acquisition macro 35 beginning at decision 600. The lock acquisition macro 35 determines if the lock state is currently "X", i.e. the lock is currently held in the exclusive state (decision 600), before an attempt is made to change it. If not (decision 600, no branch), the program function that called the lock acquisition macro did not have an exclusive hold, and this is an error (condition 602) that concludes processing. If the lock is held exclusive (decision 600, yes branch), then the lock acquisition macro 35 atomically attempts to change the lock state from "X" to "S", change the shared lock count (shcnt) from zero to one, and increment the sequence number by one (step 610). If the atomic update fails due to interference from another processor (decision 620, yes branch), then the lock acquisition macro 35 loops back to step 600 to repeat the foregoing steps. If there was no interference (decision 620, no branch) then the requesting program function now holds a share of the lock (condition 630).

Figure 7:
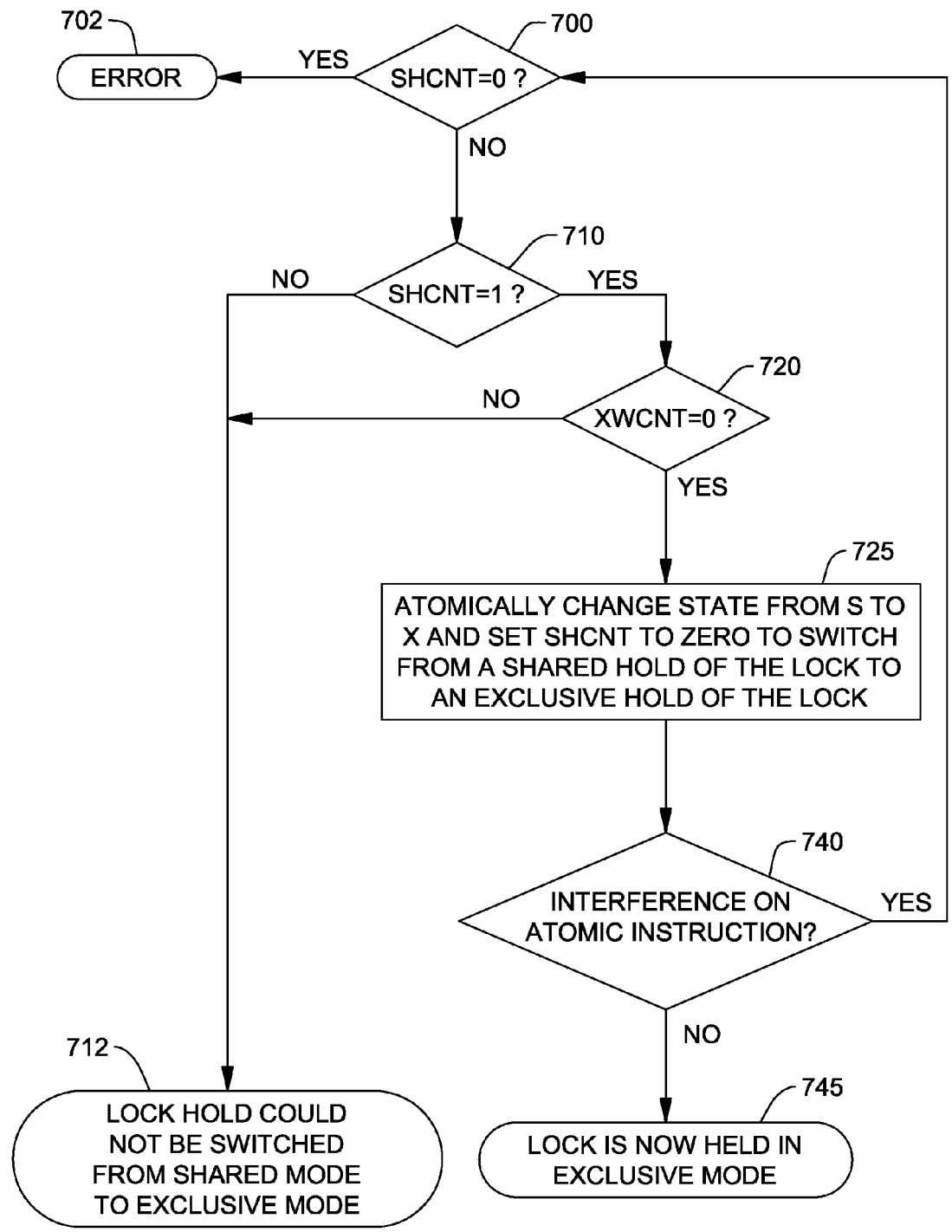
FIG. 7 is a flow chart of the lock acquisition macro of FIG. 1 in a process of attempting to change a shared hold of a lock into an exclusive hold, provided that only one share of the lock is currently held.

FIG. 7 illustrates processing by the lock acquisition macro 35 to attempt to switch a lock that is held shared to an exclusive hold without releasing the lock in between. A program function which has a shared hold of a spin lock and wants to switch to an exclusive hold invokes the lock acquisition macro 35 beginning at decision 700. In decision 700, the lock acquisition macro 35 determines if the current count of shared lock holders is zero. If so (decision 700, yes branch), the requestor does not hold a share of the lock, and this is an error (condition 702) that concludes processing. If the current shared count is not zero (decision 700, no branch), then the macro determines if the current shared count is exactly one (decision 710) and if so whether there are any exclusive requests waiting (decision 720). If the shared count is greater than one (decision 710, no branch) or there is at least one exclusive hold request waiting to be satisfied (decision 720, no branch), then the switch to an exclusive hold cannot be made and processing is concluded (condition 712). If the shared count is exactly one (decision 710, yes branch) and there are no exclusive hold requests waiting (decision 720, yes, branch), then the lock is switched from held shared to held exclusive by atomically changing the state from "S" to "X" and the shared count from one to zero (step 725). After step 725 the lock acquisition macro determines if there was interference from another processor during execution of step 725. If so (decision 740, yes branch), then the macro loops back to decision 700 to repeat the foregoing steps. If no interference occurred (decision 740, no branch), then the lock acquisition macro has successfully released the shared hold and granted an exclusive hold of the lock without making the lock available to other requestors in between (condition 745).

The following example illustrates how the present invention prevents starvation of exclusive-hold requestors by a series of shared-hold requests, by not allowing a request for a shared hold made after the request for the exclusive hold but during the current shared hold to be granted. An exclusive requestor makes a request for an exclusive hold, and this request is processed according to FIG. 2. In this example, the exclusive hold is not currently available because the lock is held by one or more shared holders, so the lock acquisition macro fails to provide an exclusive hold in step 200, and decision 202 takes the yes branch, because the state of the lock was not available for any hold Av and not available for an exclusive hold AvX. So, the lock manager program 45 next increments the count of exclusive waiters (xwcnt) in step 204. After completing step 204 without interference (decision 206, no branch), the lock manager program 45 spins on step 208 and decision 210 until the lock becomes available for an exclusive hold, i.e. lock state equals Av or AvX in decision 210. Next, another shared request arrives on a second processor after the foregoing request for an exclusive hold, and processing occurs in accordance with FIG. 4. In accordance with the present invention, this other shared request will not be granted before the foregoing request for an exclusive hold is granted and released, even if this other shared request arrives while another processor has a shared hold on the same lock and could share the resource with this other shared request. In step 400, none of the three conditions for granting the shared hold is satisfied, i.e. (i) the current state is not Av, (ii) the current state is not AvS and (iii) while the current state is S, the current count of exclusive waiters "xwcnt" is not zero. Therefore, the lock acquisition macro will not grant the shared hold to the current shared requestor. The lock manager program 15 will not grant the shared hold to the current shared requestor either, for the following reason. In step 404, the lock manager program atomically fetches the sequence number and increments the count of shared waiters (swcnt). When step 404 is completed without interference, the lock manager program determines in decision 410 that the current state equals S (i.e. the lock is held by at least one shared owner) and the current count of exclusive waiters is greater than zero (decision 410, yes branch). Consequently, the lock manager program determines if there has been a change in the sequence number since step 404, i.e. that an exclusive hold has been granted and released since step 404 (decision 420). In the present case, the current sequence number equals the sequence number fetched in step 404 (decision 420, yes branch). Consequently, this new shared waiter loops around and around or spins on decision 420 until the current request for the exclusive hold is granted and that hold is released, causing the sequence number to be incremented (step 302 or 304, FIG. 3). Thus, the current requestor for a shared hold will not be granted the shared hold until the prior request for an exclusive hold is granted and that hold is released. This prevents "livelock", i.e. starvation of the exclusive hold requestor, by a staggered sequence of shared hold requests.

The following is an example of a sequence of lock hold requests, grants, and releases (Next Event Nn), and their effects on the State (Sn+1) of the lock, ownership of the lock, count (xwcnt) of waiting exclusive hold requestors, count (swcnt) of waiting shared hold requestors, and sequence number, i.e. number of released exclusive holds. In this example, there are seven processors (identified as processor one-processor seven) in a multiprocessor computer. In this example, there are seven program functions requesting holds while executing respectively on the seven processors. So, the grant of a hold to one of the program functions is considered a grant of the hold to the processor executing the program function.

EXAMPLE

State S1: The lock is available for all types of lock grants, i.e. state Av. There are no waiters for either a shared hold or an exclusive hold. The value of the sequence number is twelve.

Next Event N1: Processors one, two and three request and are granted shared holds.

State S2: The lock has state S and is held by three shared lock holders, processors one, two and three. There are no waiters for a shared hold and no waiters for an exclusive hold.

Next Event N2: Processor seven requests an exclusive hold and spins waiting for it.

State S3: The lock has state S and is still held by the three shared lock holders, i.e. processors one, two and three, because none of the shared lock holders has released its shared hold, and the exclusive hold request has not yet been granted. There are no waiters for a shared hold and one waiter for an exclusive hold.

Next Event N3: Processor four requests an exclusive hold and spins waiting for it.

State S4: The lock has state S and is still held by the three shared lock holders, i.e. processors one, two and three, because none of the shared holders has released its shared hold, and neither exclusive hold request has been granted. There are no waiters for a shared hold and two waiters for an exclusive hold.

Next Event N4: Processor five requests a shared hold and spins waiting for it after observing a sequence number of twelve. Processor five is not granted a shared hold, even though the lock is currently in shared state, because processor five made its request for a shared hold after at least one waiting request for an exclusive hold was made. This avoids starvation of processors seven and four.

State S5: The lock has state S and is still held by three shared lock holders, i.e. processors one, two and three, because none of the shared holders has released its shared hold, and neither exclusive hold request has been granted. There are one waiter for a shared hold and two waiters for an exclusive hold.

Next Event N5: Processor six requests a shared hold and spins waiting for it after observing a sequence number of twelve. Processor six is not granted a shared hold because processor six made its request for a shared hold after at least one waiting request for an exclusive hold was made. This avoids starvation of processors seven and four.

State S6: The lock has state S and is still held by three shared lock holders, i.e. processors one, two and three, because none of the shared lock holders has released its share of the lock, and neither exclusive hold request has been granted. There are two waiters for a shared hold and two waiters for an exclusive hold.

Next Event N6: All three processors one, two and three release their shared holds.

State S7: The state of the lock changes to AvX, i.e. available for an exclusive hold. Neither exclusive lock request has been granted yet (although this is imminent). There are two waiters for a shared hold and at this moment, two waiters for an exclusive hold.

Next Event N7: Processor four happens to acquire the exclusive hold before processor seven can. (There is no ordering imposed among the exclusive hold waiters.)

State S8: The lock has state X and is held exclusive by processor four. There are two waiters for a shared hold and one waiter for an exclusive hold.

Next Event N8: Processor one requests another shared hold and spins waiting for it after observing a sequence number of twelve.

State S9: The lock has state X and is held exclusive by processor four. There are three waiters for a shared hold and one waiter for an exclusive hold.

Next Event N9: Processor four releases its exclusive hold.

State S10: The state of the lock changes to AvS, i.e. available for one or more shared holds. Even though processor seven, which requested an exclusive hold, has been waiting longer than processor five, which requested a shared hold, according to the present invention, the waiting request for the shared hold has precedence. No shared hold has yet been granted (although this is imminent). There is one waiter for an exclusive hold, and at this moment, three waiters for a shared hold. The sequence number has been incremented to thirteen to reflect the release of the exclusive hold by processor four.

Next Event N10: Processor two requests a shared hold and spins waiting for it after observing a sequence number of 13.

State S11: The state of the lock is still AvS because the newly available lock has not yet been granted to any waiting shared requestors. There are now four waiting shared hold requestors, and one waiter for an exclusive hold.

Next Event N11: Processors one, five and six are awarded shared holds of the lock.

State S12: The state of the lock has been changed to S to indicate that the lock is currently held in the shared state. There are currently three holders of the shared lock, i.e. processors one, five and six, and the count of shared waiters has been decremented to one. Processor two has not been granted a shared hold concurrent with processors one, five and six because processor two made its request when there was an exclusive waiter, and the sequence number has not yet changed from the value of thirteen which processor two observed. There are currently one waiter for a shared hold and one waiter for an exclusive hold.

(States S10-S12 illustrate how the shared requests made before the next exclusive hold is released are batched, i.e. granted concurrently, and this is based on the sequence number. Earlier, processors five, six and one started spinning on the lock while the sequence number was twelve because the lock was already held exclusive by processor four. In quick succession, processor four releases the lock (incrementing the sequence number to thirteen) and then processor two requests a shared hold. At that point there are four shared requests and one exclusive request waiting. Next the three shared requests by processors five, six and one, which observed a sequence number of twelve, are granted, but processor two, which observed a sequence number of thirteen, is not granted a share because there is still an exclusive request outstanding and the sequence number has not changed.)

Next Event N12: Processors one, five and six release their shared holds of the lock.

State S13: The state of the lock is now AvX, i.e. available for an exclusive hold. The lock is now available for an exclusive hold because the previously granted hold was in shared state, and there is a waiting requestor for an exclusive hold. There is also a waiting request for a shared hold.

Next Event N13: Processor seven is granted an exclusive hold.

State S14: The state of the lock has been changed to X to indicate that the lock is currently held exclusive (by processor seven), and the count of waiters for an exclusive hold has been decremented to zero. There is one waiter for a shared hold.

Next Event N14: Processor seven releases its exclusive hold.

State S15: The state of the lock has been changed to AvS, i.e. available for shared state, because there is a waiter for a shared hold (and the last hold that was granted was an exclusive hold). Also, the sequence number has been incremented to fourteen to reflect the release of the exclusive hold by processor seven. There are no waiters for an exclusive hold and one waiter for a shared hold.

Next Event N15: Processor two is granted the shared hold.

State S16: The lock has state S and is held by one shared lock holder, processor two. The count of waiting requestors for a shared hold has been decremented to zero because the sole waiting requestor for a shared hold was just granted the shared hold. There are no waiters for an exclusive hold.

Next Event N16: Processor two releases its shared hold.

State S17: The state of the lock is changed to Av i.e. available for any type of lock hold. The available state is not restricted to available for an exclusive hold, even though the previous hold that was granted was shared, because there are no waiting requestors for an exclusive hold. Also, there are no waiters for a shared hold.

Lock manager program 15, lock acquisition program macro 35 and lock release program macro 45 can be loaded into computer 10 from computer readable media 57 such as magnetic disk or tape, optical media, DVD, semiconductor memory, memory stick, etc. or downloaded from Internet 59 via TCP/IP adapter card 61.

Based on the foregoing, a system, method and program for managing locks have been disclosed. However, numerous modifications and substitutions can be made without deviating from the scope of the present invention. For example, the lock management structure may also include a field identifying the sole owner of the lock in the case of an exclusive hold, or one or more owners of the lock in the case of a shared hold. The identification of each owner can be a program name, program function name, line number of the program or program function and/or the name of a processor (in a multiprocessor environment) that is currently executing the program or program function which currently owns the lock. This additional information can be used to validate requests to release a hold of a lock, and to aid in problem diagnosis.

Also, although the present invention has been illustrated herein with spin locks, this invention can be applied equally well to defer locks. As is known in the prior art, a lock management data structure for a defer lock typically includes an anchor for a "defer" queue of pending requests, which are granted first-in-first-out. A lock manager release function known in the prior art typically removes from the front of the queue either a single exclusive request or a chain of consecutive shared requests, and grants the lock to those requestors upon release by its current holder. According to the present invention, software and/or hardware is provided to grant hold (s) of the lock based in part on the type of hold(s) being released, as follows. If the current hold is shared mode, when the last shared hold is released, if the defer queue is not empty, then the first queued request must be an exclusive request, terminating the batch of shared requests which has just been satisfied; this request is therefore granted next. Conversely, if the hold being released is an exclusive hold, then the defer queue is scanned and all shared requests currently in the queue (i.e., all requests which had been made before the present exclusive hold was released) are removed from the queue and granted concurrently. If the queue remains non-empty (i.e., there are one or more exclusive requests queued), then any subsequently arriving shared requests will be queued and granted in the next batch of shared requests, following the grant and release of the exclusive request now at the head of the queue.

Therefore, the present invention has been disclosed by way of illustration and not limitation, and reference should be made to the following claims to determine the scope of the present invention.

What is claimed:

1. A computer program product to manage locks under conditions wherein there is a first shared hold on a lock, a first pending request for a first exclusive hold on said lock, said first pending request for said first exclusive hold being made after said first shared hold was granted, there is a second pending request for a second exclusive hold on said lock, said second pending request for said second exclusive hold being made after said first pending request for said first exclusive hold, there is a third pending request for a second shared hold, said third pending request for said second shared hold being made after said second pending request for said second exclusive hold, wherein said computer program product comprises:

a computer readable media;

first program instructions to grant one of said pending requests for an exclusive hold in response to said first shared hold being released;

second program instructions to grant said third pending request for said second shared hold in response to release of said exclusive hold previously granted in response to said one request for an exclusive hold; and third program instructions to grant another of said requests for an exclusive hold in response to said second shared hold being released; and wherein said first, second and third program instructions are stored on said media in functional form.

2. A computer program product as set forth in claim 1, wherein there is a fourth request for a third shared hold on said lock, said fourth request for said third shared hold being made after said third request for said second shared hold and before release of said exclusive hold previously granted in response to said one request for an exclusive hold; and said second program instructions grant said fourth request for said third shared hold for substantially concurrent holding with said second shared hold.

3. A computer program product as set forth in claim 1, wherein there is a fourth request for a third shared hold on said lock, said fourth request for said third shared hold being made after said third request for said second shared hold and after release of said exclusive hold previously granted in response to said one request for an exclusive hold; and further comprising:
   fourth program instructions to grant said fourth request for said third shared hold after release of said second exclusive hold; and wherein said fourth program instructions are stored on said media in functional form.

4. A computer system for managing locks under conditions wherein there is a first shared hold on a lock, a first pending request for a first exclusive hold on said lock, said first pending request for said first exclusive hold being made after said first shared hold was granted, there is a second pending request for a second exclusive hold on said lock, said second pending request for said second exclusive hold being made after said first pending request for said first exclusive hold, there is a third pending request for a second shared hold, said third pending request for said second shared hold being made after said second pending request for said second exclusive hold, wherein said computer system comprises:
   means for granting one of said pending requests for an exclusive hold in response to said first shared hold being released;
   means for granting said third pending request for said second shared hold in response to release of said exclusive hold previously granted in response to said one request for an exclusive hold; and
   means for granting another of said requests for an exclusive hold in response to said second shared hold being released.

5. A computer system as set forth in claim 4, wherein there is a fourth request for a third shared hold on said lock, said fourth request for said third shared hold being made after said third request for said second shared hold and before release of said exclusive hold previously granted in response to said one request for an exclusive hold; and further comprising means for granting said fourth request for said third shared hold for substantially concurrent holding with said second shared hold.

6. A computer system as set forth in claim 4, wherein there is a fourth request for a third shared hold on said lock, said fourth request for said third shared hold being made after said third request for said second shared hold and after release of said exclusive hold previously granted in response to said one request for an exclusive hold; and further comprising means for granting said fourth request for said third shared hold after release of said second exclusive hold.

7. A method for managing locks under conditions wherein there is a first shared hold on a lock, a first pending request for a first exclusive hold on said lock, said first pending request for said first exclusive hold being made after said first shared hold was granted, there is a second pending request for a second exclusive hold on said lock, said second pending request for said second exclusive hold being made after said first pending request for said first exclusive hold, there is a third pending request for a second shared hold, said third pending request for said second shared hold being made after said second pending request for said second exclusive hold, said method comprising the steps of:
   granting one of said pending requests for an exclusive hold in response to said first shared hold being released;
   granting said third pending request for said second shared hold in response to release of said exclusive hold previously granted in response to said one request for an exclusive hold; and
   granting another of said requests for an exclusive hold in response to said second shared hold being released.

8. A method as set forth in claim 7, wherein there is a fourth request for a third shared hold on said lock, said fourth request for said third shared hold being made after said third request for said second shared hold and before release of said exclusive hold previously granted in response to said one request for an exclusive hold; and further comprising the step of granting said fourth request for said third shared hold for substantially concurrent holding with said second shared hold.

9. A method as set forth in claim 7, wherein there is a fourth request for a third shared hold on said lock, said fourth request for said third shared hold being made after said third request for said second shared hold and after release of said exclusive hold previously granted in response to said one request for an exclusive hold; and further comprising the step of granting said fourth request for said third shared hold after release of said second exclusive hold.

* * * * *